(12) United States Patent
Purchase et al.

(10) Patent No.: US 9,858,374 B1
(45) Date of Patent: Jan. 2, 2018

(54) METHOD AND SYSTEM FOR DISPLAYING WAVEFORM RESULTS DIRECTLY ON A SCHEMATIC

(71) Applicant: Cadence Design Systems, Inc., San Jose, CA (US)

(72) Inventors: John Purchase, Felton, CA (US); Ian Gebbie, Edinburgh (GB)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/165,334

(22) Filed: May 26, 2016

(51) Int. Cl.
*G06F 17/50* (2006.01)

(52) U.S. Cl.
CPC ...... *G06F 17/5045* (2013.01); *G06F 17/5009* (2013.01); *G06F 2217/74* (2013.01)

(58) Field of Classification Search
CPC .................. G06F 17/5009; G06F 17/5022
USPC ........................................................ 716/139
See application file for complete search history.

(56) References Cited

U.S. PATENT DOCUMENTS

| | | | |
|---|---|---|---|
| 7,277,804 B2 | 10/2007 | Gebbie et al. | |
| 7,809,542 B2 * | 10/2010 | Bazinet et al. | G06F 17/5022 703/14 |
| 7,865,857 B1 | 1/2011 | Chopra et al. | |
| 8,804,326 B2 * | 8/2014 | Ashida | A63F 13/06 248/346.03 |
| 9,189,578 B1 * | 11/2015 | Giangarra et al. | G06F 17/5045 |
| 9,645,715 B1 * | 5/2017 | Jain et al. | G06F 3/0484 |

* cited by examiner

*Primary Examiner* — Sun Lin
(74) *Attorney, Agent, or Firm* — Vista IP Law Group, LLP

(57) ABSTRACT

An improved approach is provided to displaying waveform data, where a schematic and corresponding waveform data can be displayed directly on a schematic of an electronic circuit. By providing both the schematic and waveform results in a same display, circuit designers and verification engineers are given more control over their working environments and can more efficiently utilize available data including the schematic and the waveform data. Furthermore, results can be pinned to a relevant net to which those results correspond providing circuit designers and verification engineers with an ability to view only the available data they wish to view, and to do so in a context of the electronic circuit itself on the schematic.

20 Claims, 10 Drawing Sheets

METHOD AND SYSTEM FOR DISPLAYING WAVEFORM RESULTS DIRECTLY ON A SCHEMATIC

FIELD

This disclosure relates to the field of electrical design and verification systems.

BACKGROUND

Modern electronic design is typically performed with computer aided design (CAD) tools or electronic design automation (EDA) systems. To design a circuit, such as an integrated circuit (IC), a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design of a layout and verification.

Circuit designers and verification engineers use different methods to verify circuit designs. One common method of verification is the use of simulation. Simulation dynamically verifies a design by monitoring behaviors of the design with respect to test stimuli. For many types of designs, simulation can and should be performed during the design process to ensure that the ultimate goals are achievable and will be realized by the finished product.

For example, SPICE and FASTSPICE are common types of simulators that perform simulation to verify the operation of an electronic design. With these types of tools, the electronic design is converted into a system of equation(s), which is then solved for a given set of inputs to check the state of specific portions of the circuit at given points in time.

A significant portion of the data pertaining to the simulation activities may be waveform data. In many cases, the waveform is the output data that results from performing simulation on analog or analog/mixed signal designs. For example, a given circuit design may receive a set of stimulus data, where simulation of a model of that circuit design is performed using the stimulus to identify the resulting waveform pattern from expected operation of that design. In other cases, the waveform data is the input data that is fed into a circuit design for simulation.

The EDA tool may employ either a waveform viewing tool or a waveform editing tool to visually display waveform data onto the user interface of a user display apparatus. These tools are operated separately from the schematic portions of the EDA tools. Which requires separate review of the schematics being analyzed and the waveform results corresponding to those schematics.

Therefore, there is a need for an improved approach to handle waveform data that that can adequately address these problems with the conventional tools.

SUMMARY

Embodiments of the invention provide an improved method, system, and computer program product for displaying waveform results directly on a schematic. By providing both the schematic and certain waveform results on their display, circuit designers and verification engineers are given more control over their working environment and may more efficiently utilize the available data. Furthermore, results can be pinned to the relevant net to which those results correspond providing circuit designers and verification engineers with the ability to view only the data they wish to view, and to do so in the context of the circuit itself in a schematic design program.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

DETAILED DESCRIPTION

Embodiments of the invention provide an improved method, system, and computer program product for displaying waveform results directly on a schematic. By providing both the schematic and certain waveform results on a display, circuit designers and verification engineers, herein users, are given more control over their working environment and may more efficiently utilize the available data. Furthermore, results can be pinned to the relevant net to which those results correspond providing users with the ability to view only the data they wish to view, and to do so in the context of the circuit itself directly on a schematic.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
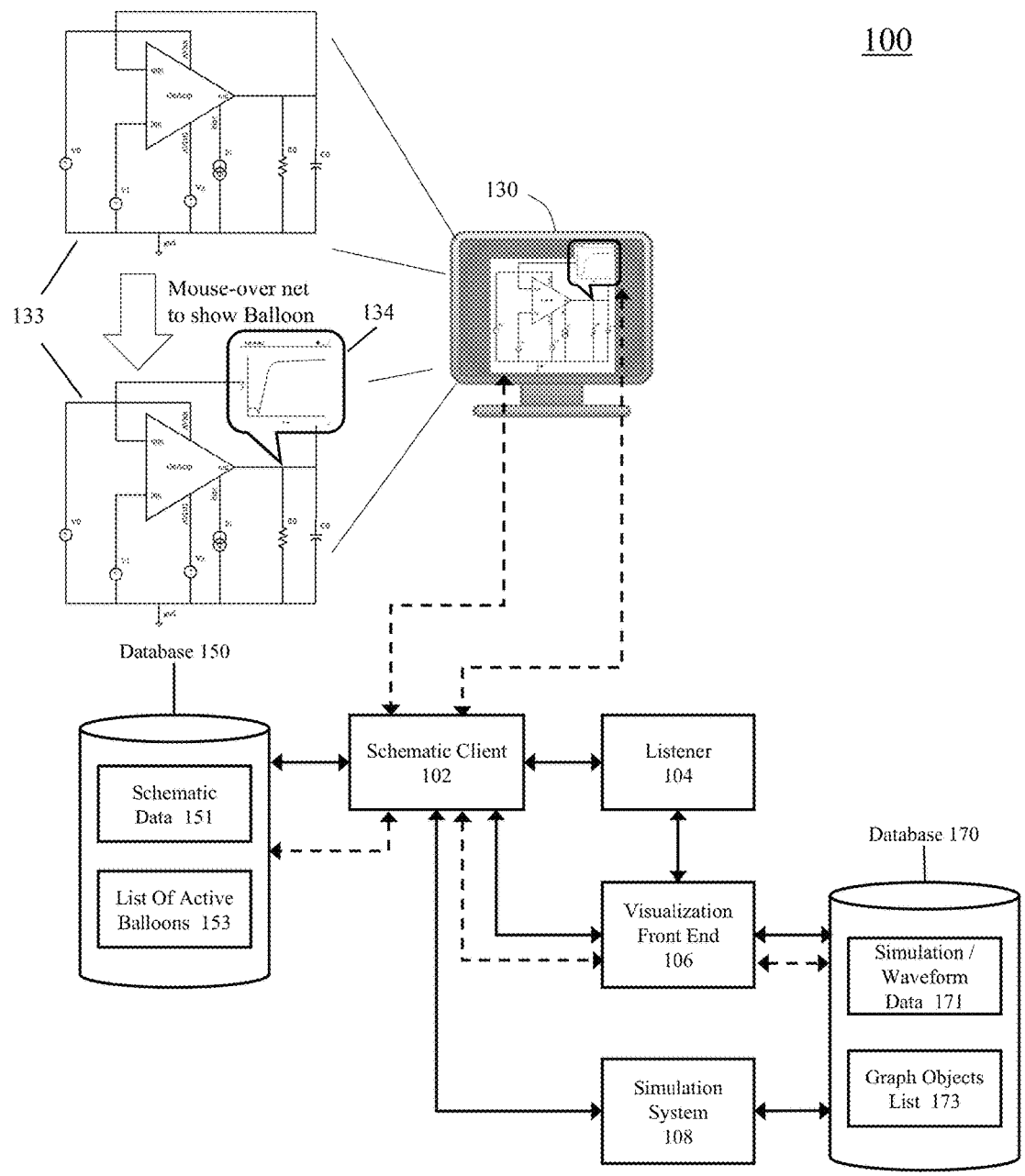
FIG. 1 illustrates an example system which may be employed in some embodiments of the invention to implement waveform visualization of an electronic design directly on a schematic.

FIG. 1 illustrates an example system 100 which may be employed in some embodiments of the invention to implement waveform visualization of an electronic design directly on a schematic. System 100 may include a user interface 130, a schematic client 102, a listener 104, a visualizations front end 106, a simulation system 108, and databases 150 and 170.

The user interface 130 provides a graphical interface to the users. The graphical interface provides for user interaction using human interface devices, such as mice or other pointing devices, keyboards, touch screen, and the like. The user interface 130 includes a first schematic 133, here illustrated as an operational amplifier circuit, which corresponds to a schematic that a user may be designing and/or testing. As illustrated, the user interface can be used for selection of results at a particular net, such as by way of a user mouse-over action corresponding to a net. As a result of the mouse-over or other action, a waveform may be displayed in a balloon 134 directly over the schematic for analysis by the user. Furthermore, while only one balloon is illustrated, there may be one or more balloons which could be selectively shown or hidden at a user's discretion for any net that is of interest and has associated waveform data to be displayed. FIGS. 6-9 provide further illustration of the graphical interface, and further discussion associated therewith.

The schematic client 102, may be any appropriate schematic client as is known in the art. However, the schematic client 102 must also be modified to provide support for the balloons and waveform data as will be discussed. Here the schematic client is coupled to a simulation system 108, a database 150, a visualization front end 106, and a listener 104. Ordinarily a schematic client may interface with a simulation system 108, such that the design information in the schematic, including circuit elements, interconnections and specifications for external inputs and outputs, can be used to generate simulation/waveform data which plots the expected behavior of the simulated circuit. Such coupling is normally effectuated via an application program interface (API), whereby one or more types of interactions are enabled between programs or modules such that exchange of information can take place. Here, the schematic client may include one or more APIs to interface with the database 150, the listener 104, the visualization front end 106, and the simulation system.

The database 150 may include schematic data 151 and a list of active balloons 153. Schematic data, as is known, is represented as a series of connections between components and various input and output elements. The list of active balloons 153 provides for tracking and management of balloons that have been generated corresponding to one or more nets or connections associated with the schematic. Such a list may be stored in any manner appropriate, such as a linked list, a table, a series of structs. Additionally, each balloon may be associated with an ID or token, generated from the associated net, the schematic, user information, and/or session information. In this way, balloons can be managed for the purposes of storing past results, reusing results, and efficiency of operation.

The simulation system 108, may be any appropriate simulation system as is known in the art. Such systems receive schematic data and use corresponding models to generate waveform data which models the operation of a circuit. The simulation system 108 is connected to a database 170 which includes at least simulation/waveform data 171. Generally, simulation systems include one or more APIs that enable the receipt of schematic data 151 from schematic clients 102 and the generation of simulation/waveform data 171.

The visualization front end 106 is coupled to the schematic client 102 and to the database 170. The visualization front end 106 accesses the simulation/waveform data 171 in order to generate waveform display data. Waveform display data may be in the form of a pre-rendered image, or in a dataset packaged for display in a balloon such as balloon 134 or some combination thereof. To determine what waveform display data is relevant, the visualization front end 106 may include an API for interfacing with the schematic client 102, whereby the schematic client 102 may transmit identification information such as an ID or token to the visualization front end 106. Furthermore, the schematic client 102 may also transmit additional information such as appropriate axis ranges, display area information, labeling information, or other relevant information. Using the data received from the schematic client 102, the visualization front end 106 may generate a graph objects list 173 such as in a linked list, a table, a series of structs or other appropriate management structure for ongoing tracking of existing waveform display data that includes at least some of the received identification information from the schematic client 102. Furthermore, the visualization front end 106, may use an API to access the simulation/waveform data 171. Specifically, the visualization front end 106, may access the simulation/waveform data 171 to generated a pre-rendered image as indicated by the schematic client 102, or to package the appropriate data for transmission to the schematic client 102, or some combination thereof.

Listener 104, may be instantiated by either the schematic client 102, or the visualization front end 106, either as a result of the first request or in anticipation of a first request. The listener is coupled to the schematic client 102 and the visualization front end 106 for the purpose of monitoring the schematic client and/or the visualization front end 106 to identify any corresponding changes to the waveform data object 134 displayed in the balloons, including at least, resizing, zooming, panning, shrinking, expanding updating or changing preferences. The listener 104 may be a single instantiated module as illustrated here to monitor all waveform display objects 134, or a corresponding listener may be instantiated for, and paired with, each respecting waveform display object 134. The listener 104 may enable 2-way communications between the schematic client 102 and the visualization front end 106.

By way of example, the schematic client may display a schematic to a user (such as schematic 133) which has corresponding data stored in database 150 as schematic data 151 (see dashed lines between user interface 130, schematic client 102 and database 150). A user may mouse-over a net or otherwise interact with a net to initiate the display of a balloon which displays waveform data 134 for that particular net. To display the waveform data, the schematic client will, if not already generated, initiate the simulation system 108 to generate simulation data, and issue a command to the visualization front end 106 to request waveform data in the necessary format (see dashed lines between user interface 130, schematic client 102, visualization front end 106, and database 170). The visualization front end 106, will retrieve the appropriate data from simulation waveform data 171 and generate a pre-rendered image of the waveform data or packaged data set and transmit it to the schematic client 102. After receiving the appropriate waveform data from the visualization front end the schematic client will display a balloon populated using the received waveform data. Additionally, at some point in the process after the initial request, either the schematic client 102 or the visualization front end 106 may instantiate a listener such as listener 104, to monitor changes from either the schematic client 102 side or the visualization front end 106, or both. In some embodiments, if the waveform data is unavailable then an empty a place holder balloon may be displayed until the schematic client receives notification the missing data is available or could otherwise be generated, at which point the appropriate command may be issued to the visualization front end to populate the empty balloon.

Figure 2:
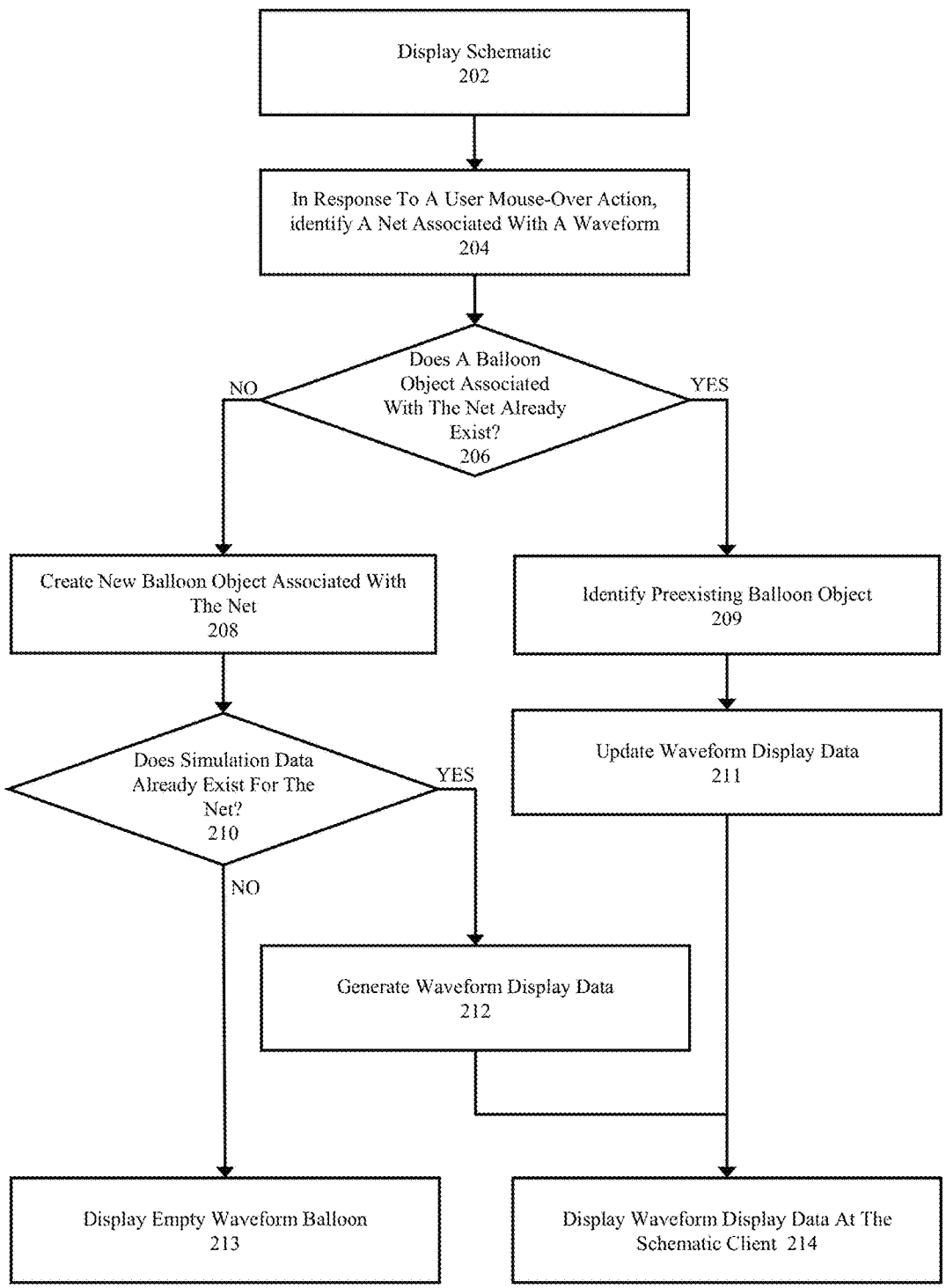
FIG. 2 shows a flowchart of an approach to implement waveform visualization of an electronic design directly on a schematic according to some embodiments of the invention.

FIG. 2 shows a flowchart of an approach to implement waveform visualization of an electronic design directly on a schematic according to some embodiments of the invention. The process includes, displaying a schematic at 202, identifying a net associated with a waveform in response to a user mouse-over action at 204, determining if a balloon object associated with the net already exists at 206, if a balloon object already exists that is associated with the net then the preexisting balloon object is identified at 209, waveform display data is optionally updated at 211, and at 214 waveform display data is displayed at the schematic client at 214. If a balloon object associated with the net does not already exists then a new balloon objected associated with the net is created at 208, and a determination is made at 210 whether the simulation data already exists for the net. If the simulation data does not already exist then at 213 an empty waveform balloon is displayed, otherwise if the simulation data for the net does already exist then the waveform display data is generated at 212, and at 214 waveform display data is displayed at the schematic client at 214

Schematic display at 202 can be accomplished using a schematic client as known in the art. However, the schematic client must be modified to support the display of balloons with waveform display data as described. For instance, the schematic client should be modified to provide the additional data structures necessary to support tracking of waveform display data and balloons and modification to the graphical display to support the display thereon of the waveform display data directly on the schematic display.

At 204, the system responds to a user mouse-over action or selection at a net that is associated with a waveform. For instance, a user may mouse-over or select the output of an operational amplifying, and such amplifier would be associated with a waveform whether or not the actually waveform data is already generated.

At 206, the system determines if a balloon object exists that is already associated with the net. For example, the system may use a net identifier, to search a list of objects to determine if a balloon object already exists. In the alternative, any other appropriate data structure may be used, such as a table, a linked list, or a struct to manage balloon objects.

If the system determines that a balloon object does not already exist at 206, then the process continues at 208, where a new balloon object is created that is associated with the net. For instance, a new balloon object may be created by adding an entry in a list of active balloons that includes an identifier for the particular balloon and a net identifier. Furthermore, the balloon object may also be associated with a link that is instantiated at a particular location in memory, where a struct is generated to hold the waveform display data.

After the balloon object is created at 208, the process continues by determining if simulation data already exists for the net at 210. If at 210 it is determined that the simulation data does not already exist, then balloon may be populated with an empty waveform balloon for display to the user at 213. The empty waveform balloon may further indicate to the user that one or more actions may be needed to enable the empty waveform balloon to be populated, or in the alternative could automatically trigger the necessary actions to be taken by the schematic client 102. Furthermore, the empty waveform balloon could be displayed until the user minimizes or closes the balloon or until the necessary data is available to populated the empty waveform balloon. If at 210 it is determined that the simulation data already exists, then the process can continue at 212 where the waveform display data may be generated.

At 212, waveform display data is generated. The process may include generating waveform/simulation data if the data has not yet been generated. After the waveform/simulation data has been generated a subset of the waveform/simulation data is selected by the system and either a pre-rendered image is generated for display as waveform display data or a set of data is packaged for rendering for display at the schematic client.

If the system determines that a balloon object does already exist at 206 then the process continues at 209 where the correct preexisting balloon object is identified. For instance, the system may identify the correct balloon object in the list of active balloons 153. Information from this list may also be transmitted to the visualization front end 106 where the visualization front end identifies the correct waveform display data using the of graph objects list 173.

Similarly, if the system determined that a corresponding balloon object does already exist at 206, the process continues at 211 where the waveform display data may be updated or retransmitted as indicated by the schematic client 102. For instance, updates might include resizing, panning, or iterating additional results overlaid over the original results. The overlaid results can enable a user, to determine whether a change had the desired effect, or if it is trending in the desired direction.

Finally, at 214, the waveform display data may be displayed at the schematic client directly on the schematic. Whereby a user may view the data and interact with the data to assist in the design/verification process.

Further details of the process are illustrated in at least FIGS. 3-5 below, where the processes of the system are expanded with respect to the schematic client 102, the visualization front end 106, and the listener 104 respectively.

Figure 3:
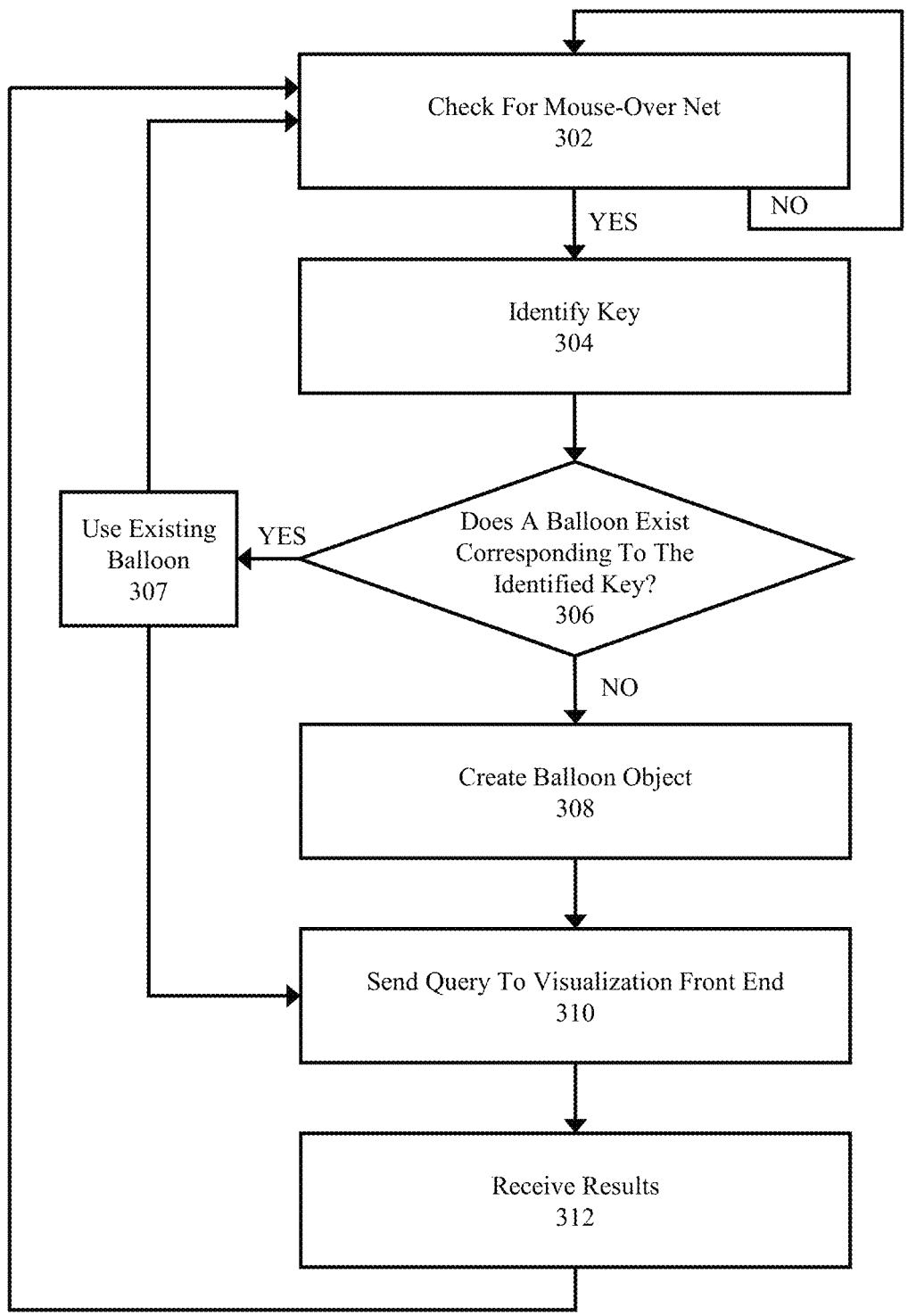
FIG. 3 shows a more detailed view of the approach in FIG. 2 from the perspective of the schematic client illustrated in FIG. 1 according to some embodiments of the invention.

FIG. 3 shows a more detailed view of the approach in FIG. 2 from the perspective of the schematic client illustrated in FIG. 1 according to some embodiments of the invention. The process includes checking for a mouse-over of a net at 302, identifying a key at 304, determining if a balloon exists corresponding the identified key at 306, either creating a balloon object at 308 or using an existing balloon at 307, if the balloon is new or needs updating the system may proceed to 310 where a query is sent to the visualization front end, and receiving results at 312 from the visualization front end before returning to 302 to continue monitoring the schematic for mouse-over actions. Furthermore, in many situations the existing balloon at 307 will not need updating, but will simply need to be displayed in response to the mouse-over action.

At 302, the schematic client monitors the user interface for a mouse-over action or equivalent. For instance, a user could select a net via a mouse click or with button press from another pointing device. The user could also select a particular net using a search function or using a keyboard to select a particular net or the display of an associated balloon.

At 304, a key corresponding to the net is identified. Such a key could be constructed from a net ID, schematic ID, session ID, user identifier or other information. For instance, a net ID and schematic ID could identify the appropriate net for the indicated schematic.

The identified key is used at 306 to determine if a balloon exists that corresponds to the identified key. This may be accomplished by searching an appropriate data structure such as the list of active balloons 153. In other embodiments the data structure may be a table, index, list, linked list, tree structure, or any other structures for tracking objects as is known.

If a balloon exists that corresponds to the net, then at 307 the existing balloon is used. In most situations the preexisting balloon may simply be displayed to the user, and then the process may continue at 302. However, in certain circumstances, such as if the balloon data is deemed to be stale the process may continue at 310 where a query is sent to the visualization front end in order to update the balloon. Furthermore, corrupted waveform display data or waveform display data that is not appropriately formatted for the current display resolution or real estate may trigger the requested update to the visualization front end at 310.

If a balloon does not exist or one cannot be identified at 306 then at 308 a new balloon object is created. Creation may include adding an entry on an appropriate data structure such as the list of active balloons 153. However, creation may also include reserving appropriate storage space for the waveform display data to be retrieved and storing a creation time, parameter information such as X and Y axis scales and/or ranges, labels, coloring of the waveform, entries for a last update to the waveform, schematic information, available display area, and owner information.

At 310 a query is sent to the visualization front end 310 for the appropriate waveform display data. The query might include any of the information discussed in the previous paragraph, such as labels, parameter information like X and Y axis scales, display area. In this way the schematic client can specify both the appearance of the waveform display data.

Finally, at 312, the schematic client receives the results from the visualization front end 106. At this point the schematic client must store the waveform display data in the appropriate data structure and display the waveform display data to the user.

Figure 4:
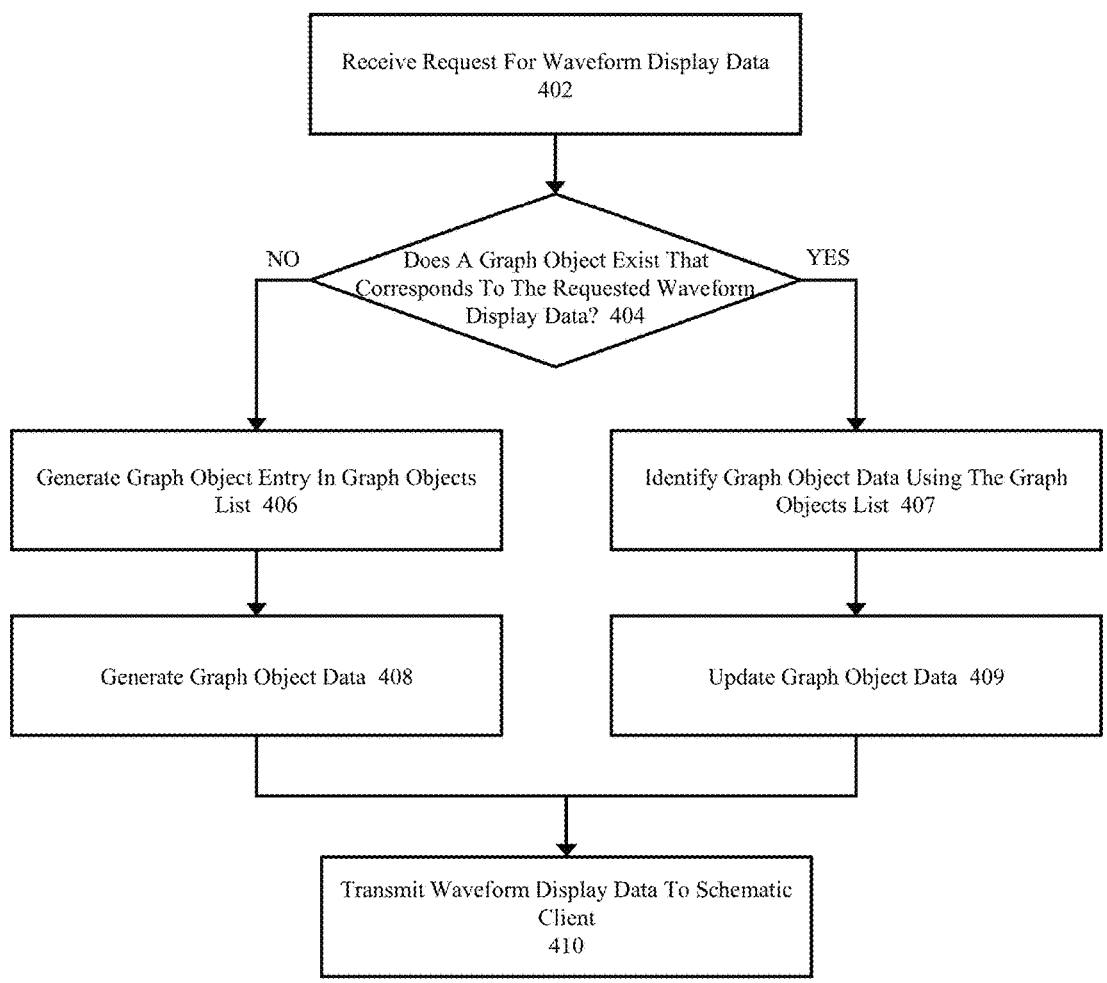
FIG. 4 shows a more detailed view of the approach in FIG. 2 from the perspective of the visualization front end illustrated in FIG. 1 according to some embodiments of the invention.

FIG. 4 shows a more detailed view of the approach in FIG. 2 from the perspective of the visualization front end illustrated in FIG. 1 according to some embodiments of the invention. FIG. 4 illustrates the actions that occur between the schematic clients sending a request to the visualization front end at 310 and the receipt of the results of the visualization front end at 312. The process includes receiving a request for waveform display data at 402, determining if a graph object exists that corresponds to the requested waveform display data at 404, if a corresponding graph object does not exist then an entry in a graph objects list is generated at 406 and graph object data is generated at 408, otherwise if a graph object does exist then the graph object data is identified using the graph object list at 407 and the graph object data is updated at 409, and finally waveform display data corresponding to the graph object data is transmitted to the schematic client at 410.

At 402, a request for waveform display data is received. As discussed above, the request may also include various specification for the requested data, such as a net identifier, a schematic identifier, axis information and ranges, labeling information, coloring and the like.

At 404, the visualization front end determines if a graph object exists that corresponds to the requested waveform display data. This may be accomplished by searching an appropriate data structure such as the list of graph objects 173. In other embodiments the data structure may be a table, index, list, linked list, tree structure, or any other structure for tracking objects as is known.

If at 404 no graph object is identified that corresponds to the requested waveform data, then at 406 an entry is generated in the list of graph objects 173. In some embodiments additional information may be stored as discussed above to such as a net identifier, a schematic identifier, axis information and ranges, labeling information, coloring and the like.

After 406, at 408 Graph object data is generated that corresponds to the requested waveform display data. For instance, graph object data could be generated using known tools for viewing waveforms, modified to provide support for the schematic client. The tools for viewing waveforms could be modified to support an API for the visualization front end 106, or the visualization front end 106 could be integrated into the tools. By receiving the specifications of the requested waveform display data, the visualization front end could as part of or using a separate API could utilize the waveform viewing tools to access the simulation/waveform data 171, and generate the appropriate waveform display data or packaging the simulation/waveform data for transmission to the schematic client.

If, at 404, an existing graph object is identified that corresponds to the requested waveform display data, then at 407 the graph object data is identified using the list of graph objects. For instance, the graph object data could be identified by an entry with a pointer corresponding to the waveform display data, or in the alternative the list could be in the form of a linked list of structs that themselves contain the waveform display data. In some embodiments additional information may be stored as discussed above, such as a net identifier, a schematic identifier, axis information and ranges, labeling information, coloring and the like.

After 404, the graph object data is updated as appropriate at 409. For instance, administrative information could be updated, such as last accessed, or last requested or substantive data could be updated such as the range, labeling, or other details of the waveform display data and if necessary the waveform display data itself. For example, a request to updated the waveform display data to accommodate a user action such as a zoom operation, might comprise updating the range information in the graph object data, and regenerating or repacking the waveform display data using the updated range information. Furthermore, other updates or modifications could be requested as discussed, such as panning, or overlaying additional simulation/waveform data over the already existing waveform data and adding appropriate labeling or other visual identifiers or modifications such that a user would be able to identify a newer result over an older result.

Finally, at 410, the waveform display data contained in the updated or newly generated graph object data is transmitted to the schematic client for display.

Figure 5:
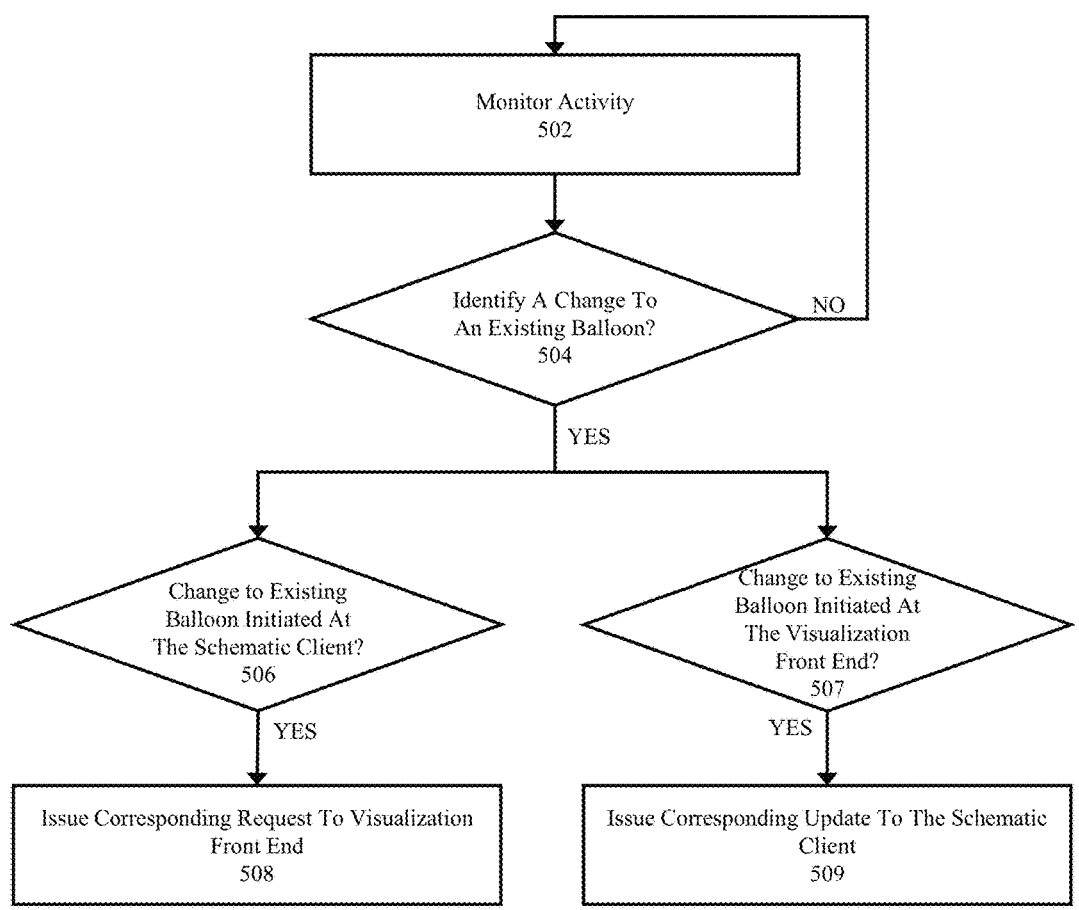
FIG. 5 shows a more detailed view of the approach in FIG. 2 from the perspective of the listener illustrated in FIG. 1 according to some embodiments of the invention.

FIG. 5 shows a more detailed view of the approach in FIG. 2 from the perspective of the listener illustrated in FIG. 1 according to some embodiments of the invention. The process includes monitoring activity at 502, identifying if there is a change to an existing balloon at 504, if there is an identified change, then at 506 the listener determines if the change is initiated at the schematic client at 506 or at the visualization front end at 507 and then issues a corresponding request to the visualization front end at 508 or a corresponding update to the schematic client at 509.

The process begins when the listener 104 is instantiated by either the schematic client 102 or the visualization front end 106. Generally, is not necessary to instantiate a listener until a first balloon object is created, as otherwise there is nothing for the listener 104 to monitor. However, in some embodiments the listener 104 could be instantiated earlier. Furthermore, while not illustrated as such, the listener 104 could serve as the go between for the schematic client 102 and the visualization front end 106, and could be integrated into one or both in some form to perform the appropriate functions.

Initially the listener 104, monitors the activity of the system at 502, where changes at the schematic client 102 or at visualization front end 106 cause the listener 104 to execute a logic flow to determine if any corresponding request or update should be issued. For instance, a change in the available display space for a balloon at the schematic client might trigger a request being issued to update the underlying waveform display data being displayed to the user, or in the alternative an undated simulation/waveform result may cause the visualization front end 106 to update a graph object containing the waveform display data and to indicate that newer data is available which may result in the listener 104 issuing a corresponding update to the schematic client.

After 502, the process continues at 504 where an attempt is made to identify a change to an existing balloon. For instance, in addition to the examples of the previous paragraph, changes may include an update to the display range or the scale of the waveform display data, or might include a request to overlay additional waveform display data of prior waveform display data results, in such a manner as both the current and the previous results are available. If no changes are identified, then the process continues at 502 where monitoring of activity continues.

If a change to an existing balloon is identified, then the process continues by determining the source of the underlying change. At 506 it is determined if the change is initiated at the schematic client 102, and at 507 it is determined if the change is initiated by the visualization front end 106. If either 506 or 507 is true, then a corresponding request or update is issued 508 or 509 respectively.

By way of example, at 508 an update to refresh the currently displayed waveform display data in a particular balloon may be sent to the visualization front end 106 as a result of the identified activity in the schematic client.

As another example, at 509 an update to the underlying simulation/waveform data 151, may trigger an automatic update of the graph object data and the corresponding waveform display data and transmission of updated waveform display data to the schematic client. In some embodiments, a notification could be sent to the schematic client in order for it to apply default update logic or to notify the user and issue an update request if desired by the user.

Figure 6:
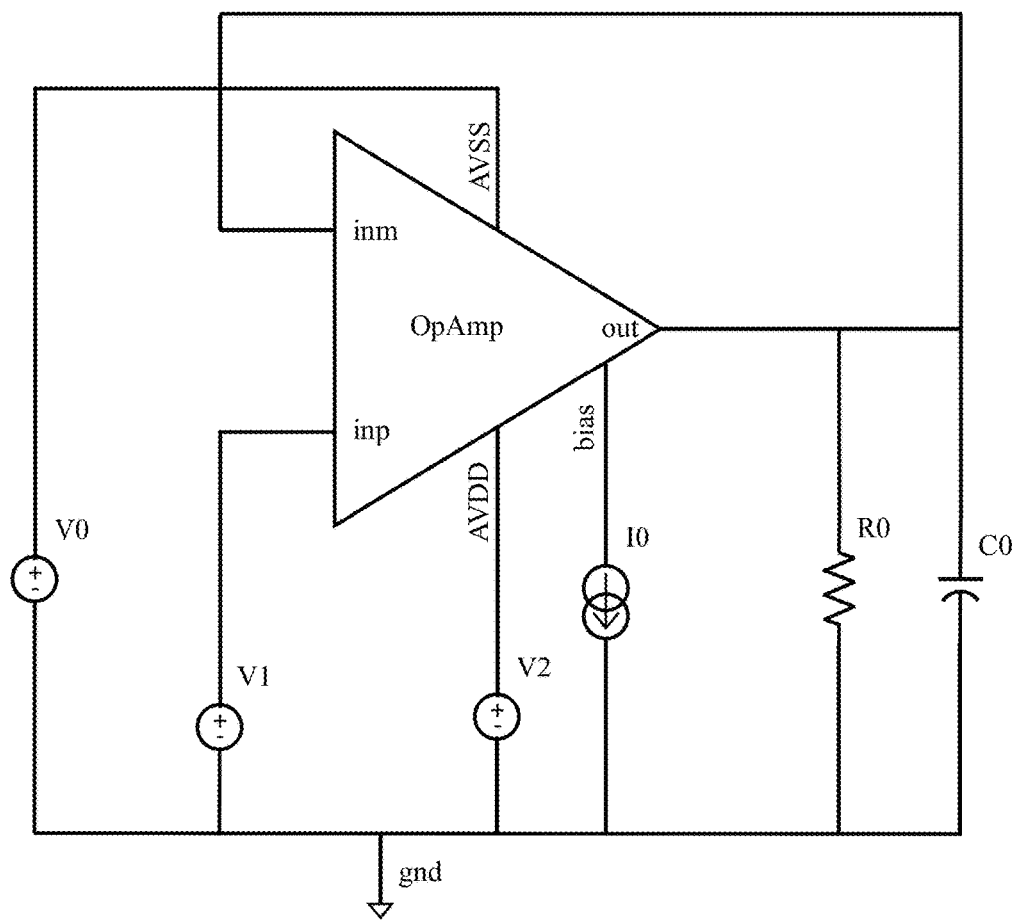
FIG. 6 illustrates an exemplary schematic according to some embodiments of the invention.

FIG. 6 illustrates an exemplary schematic according to some embodiments of the invention. The schematic 600 illustrated in the figure is merely intended to serve as an example of a schematic as would be viewed in a schematic client.

The schematic illustrated includes voltage sources V0, V1, and V2, current source I0, resister R0, capacitor C0, a connection to ground (gnd), and an operational amplifier (OpAmp). Between the components are a series of lines which indicate electrical connections along those lines. For instance, the output of the OpAmp labeled" out" is electrically connected to one side of R0 and C0, and is connected to the input of the OpAmp labeled "inm". The electrical connections are also commonly referred to as nets. For instance, the series of lines that connect "out" to R0, C0, "inm" would all be considered a single net. This net and others are associated with electrical variations that may be illustrated in the form of waveform graphs to enable a user to verify that the desired behavior is being exhibited by one or more nets in the schematic. Ordinarily the circuit elements are illustrated separately from the waveforms of the nets that produce them. However, FIG. 7 shows an alternative as disclosed herein.

Figure 7:
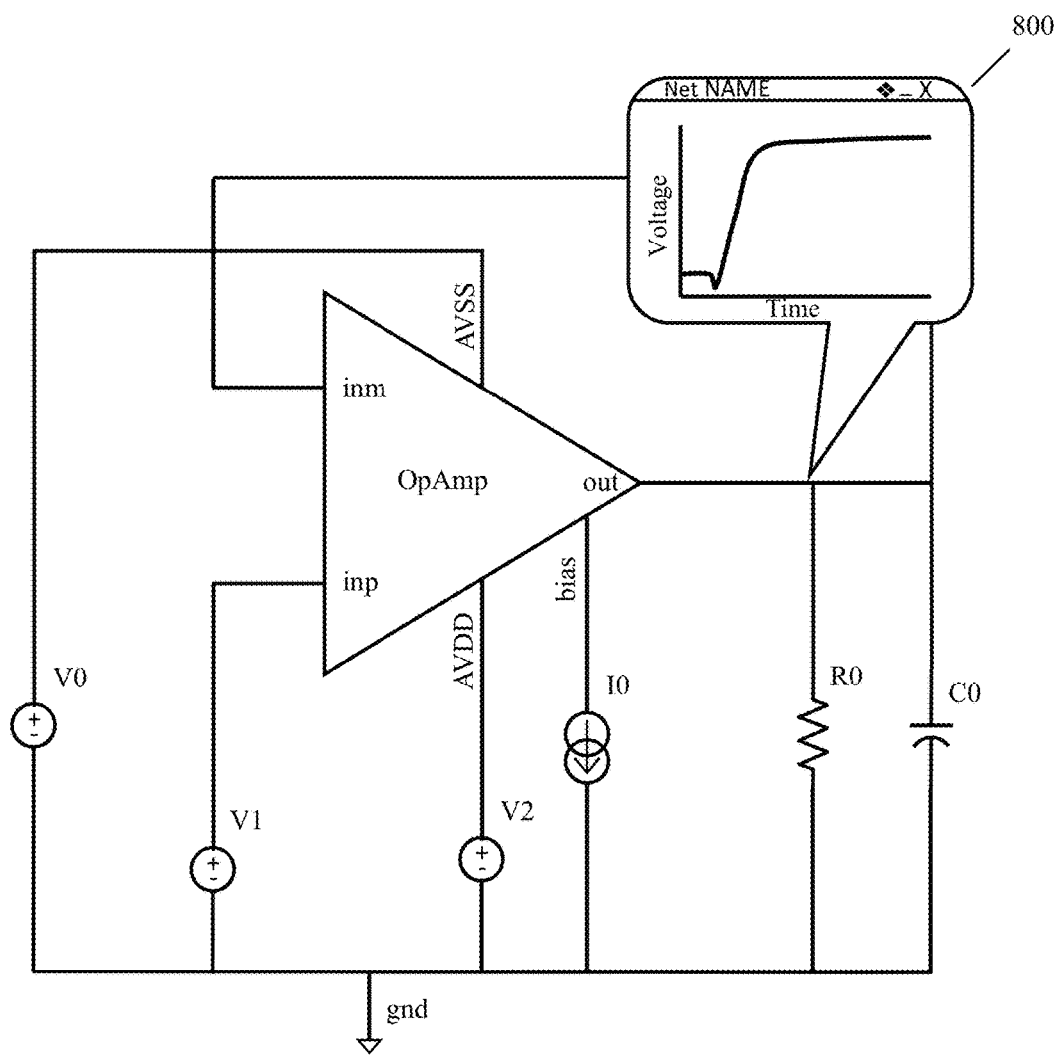
FIG. 7 illustrates an exemplary schematic with waveform data overlaid directly over the schematic according to some embodiments of the invention.

FIG. 7 illustrates an exemplary schematic with waveform data overlaid over the schematic according to some embodiments of the invention. The balloon 800 includes a graph of a waveform illustrating change over time vs voltage overlaid directly on the schematic view 600 at a schematic client 102. Details of the balloon 800 are discussed in FIG. 8.

Figure 8:
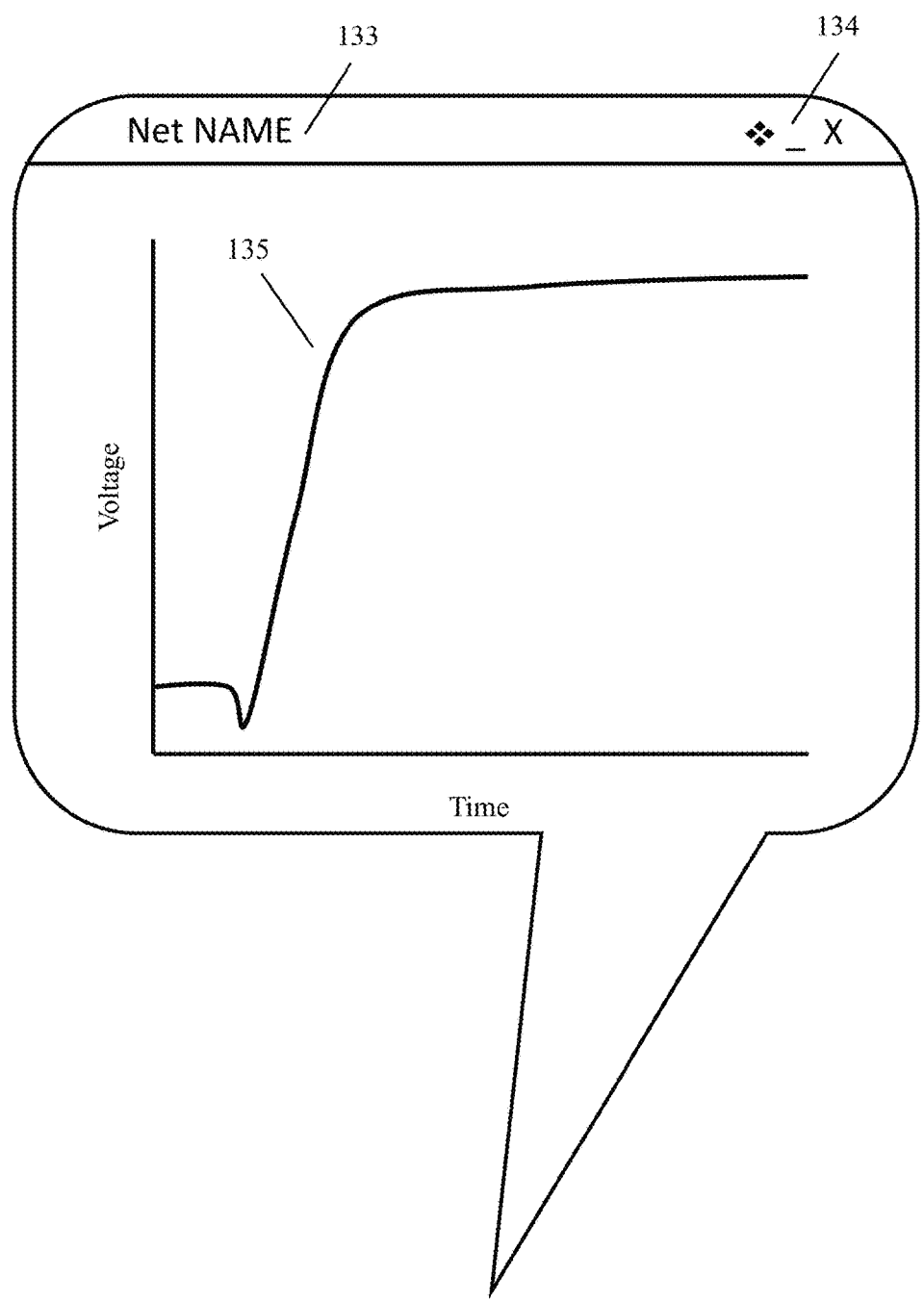
FIG. 8 illustrates an exemplary balloon displaying waveform data according to some embodiments of the invention.

FIG. 8 illustrates an exemplary balloon displaying waveform data according to some embodiments of the invention. The balloon includes an X and Y axis corresponding to time and voltage respectively, a net NAME 133 that identifies the name of the net the waveform data is being being displayed for, and control elements 134 which can be used to pin/unpin (here illustrated as unpinned), minimize, or delete a balloon. Furthermore, additional options may be available including a dropdown menu to enable a user to change labels, axis, ranges, resolution, balloon size, zooming in and out, refresh or any other modification to the balloon.

Figure 9:
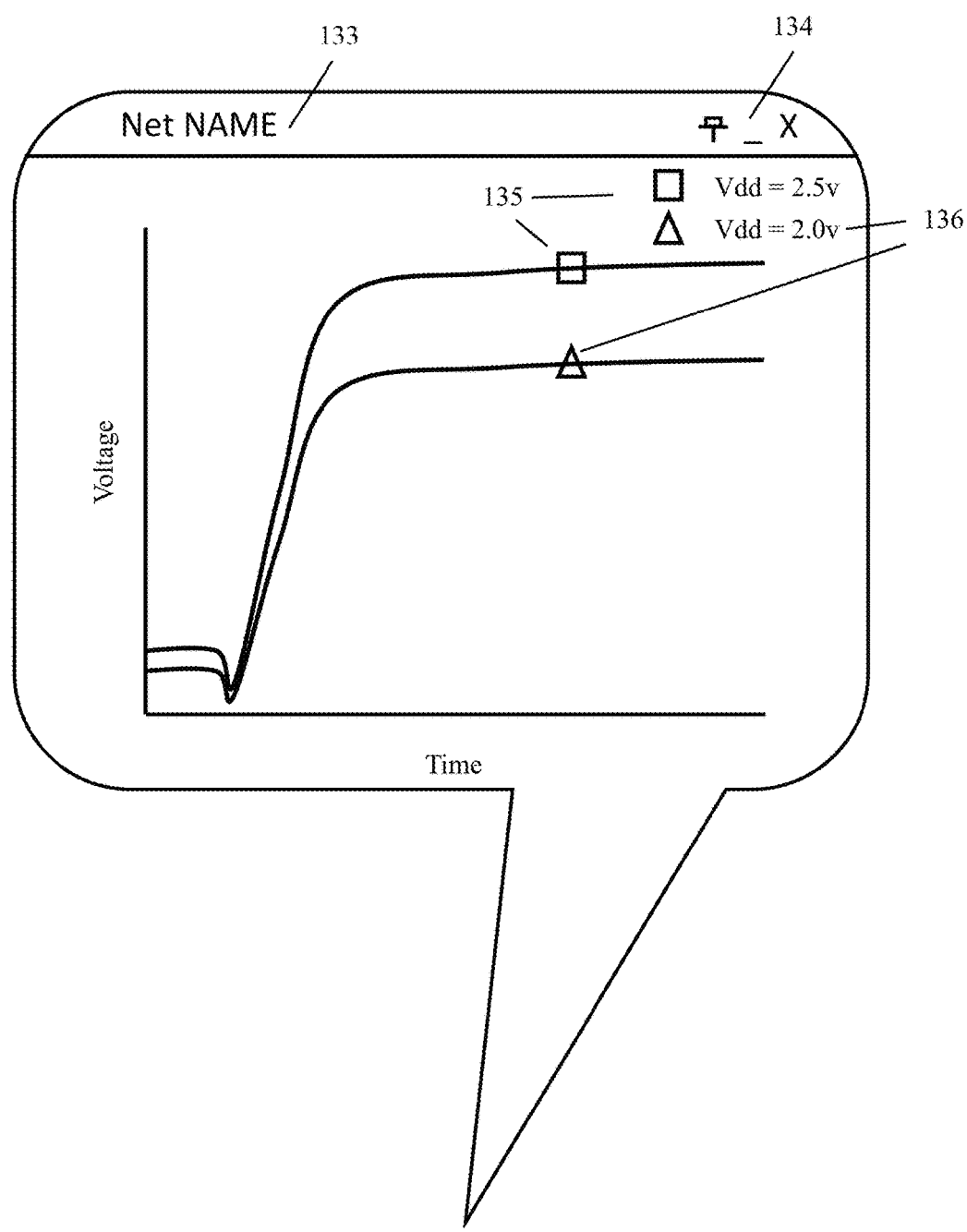
FIG. 9 illustrates an exemplary balloon displaying waveform data for different Vdd values according to some embodiments of the invention.

FIG. 9 illustrates an exemplary balloon displaying waveform data for different Vdd values according to some embodiments of the invention. FIG. 9 expands on the material of FIG. 8, via the inclusion of an additional waveform illustrations and a labels and a legend. Specifically, FIG. 9 illustrates labels and the corresponding legend at 135 and 136, where the upper waveform is labeled with a square and the legend indicated that Vdd was 2.5 v when the waveform was generated and the lower waveform is labeled with a triangle and the legend indicates that Vdd was 2.0 v when the waveform was generated. In some embodiments the different waveforms could be identified by different colors or different intensities of the same colors. Furthermore, one or more other characteristics could be provided in the legend such as the process technology the circuit is being simulated with, or the various other parameters that provide an indication for the schematic state at the time of simulation or the parameter that has changed from the time of an earlier simulation vs a latter simulation.

Furthermore, FIG. 9 illustrates the balloon in the pined state at 134, as indicated by the pin illustration. In some embodiment, all balloons may additionally be subject to a hidden/show toggle button, and may further be subject to a restore feature, where a previous balloon states may be stored, and then restored when a user re-launches a schematic with corresponding balloons. In some embodiment, the restore operation may be subject to a user preference or user prompt which is used to determine whether or not the previous balloons should also be restored.

System Architecture Overview

Figure 10:
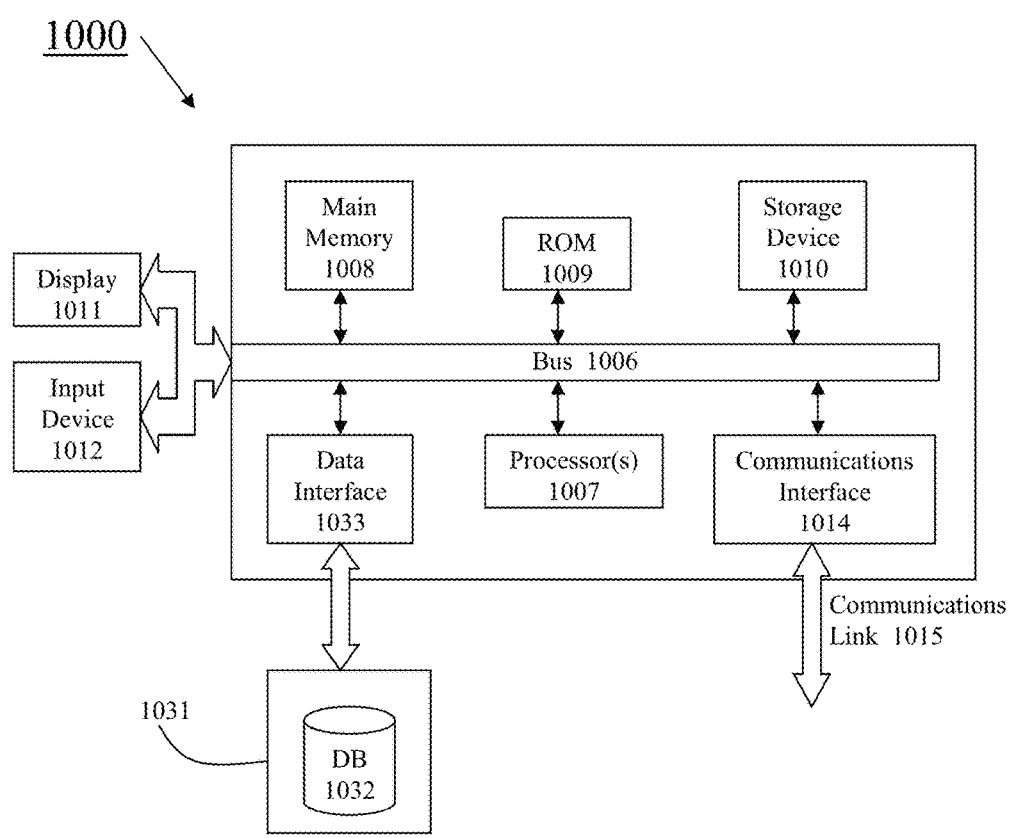
FIG. 10 depicts a computerized system on which some embodiments of the invention can be implemented.

FIG. 10 is a block diagram of an illustrative computing system 1000 suitable for implementing an embodiment of the present invention. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control.

According to one embodiment of the invention, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. Computer system 1000 may communicate through a data interface 1033 to a database 1032 on an external storage device 1031.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, the method comprising:
    displaying a schematic corresponding to an electronic circuit;
    identifying a mouse-over action at a net;
    creating a balloon object associated with the net;
    populating the balloon object with waveform data; and
    displaying the balloon object directly on the schematic.

2. The method of claim 1, wherein the waveform data comprises a pre-rendered image.

3. The method of claim 2, wherein the pre-rendered image comprises at least a first waveform and a second waveform.

4. The method of claim 1, wherein a key is identified in response to the mouse-over action.

5. The method of claim 4, wherein the step of populating the balloon object further comprises sending a query comprising at least the key to a visualization module and receiving waveform data from the visualization module, wherein the waveform data is identified within simulation results using at least the key.

6. The method of claim 5, wherein the waveform data comprises at least data identified within simulation results using at least the key, and the simulation results correspond to the electronic circuit.

7. The method of claim 1, wherein a listener is instantiated to monitor the balloon object and to issue one or more corresponding requests.

8. A computer program product embodied on a non-transitory computer readable medium, the non-transitory computer readable medium having stored thereon a sequence of instructions which, when executed by a processor, cause the processor to execute a method comprising:
    displaying a schematic corresponding to an electronic circuit;
    identifying a mouse-over action at a net;
    creating a balloon object associated with the net;
    populating the balloon object with waveform data; and
    displaying the balloon object directly on the schematic.

9. The computer program product of claim 8, wherein the waveform data comprises a pre-rendered image.

10. The computer program product of claim 9, wherein the pre-rendered image comprises at least a first waveform and a second waveform.

11. The computer program product of claim 8, wherein a key is identified in response to the mouse-over action.

12. The computer program product of claim 11, wherein the step of populating the balloon object further comprises sending a query comprising at least the key to a visualization module and receiving waveform data from the visualization module, wherein the waveform data is identified within simulation results using at least the key.

13. The computer program product of claim 12, wherein the waveform data comprises at least data identified within simulation results using at least the key, and the simulation results correspond to the electronic circuit.

14. The computer program product of claim 8, wherein a listener is instantiated to monitor the balloon object and to issue one or more corresponding requests.

15. A system for analyzing a circuit design, the system comprising:
    a processor; and a memory for holding programmable code that, when executed by the processor, causes the processor to execute a method comprising;
   displaying a schematic corresponding to an electronic circuit;
   identifying a mouse-over action at a net;
   creating a balloon object associated with the net;
   populating the balloon object with waveform data; and
   displaying the balloon object directly on the schematic.

16. The system of claim 15, wherein the waveform data comprises a pre-rendered image.

17. The system of claim 16, wherein the pre-rendered image comprises at least a first waveform and a second waveform.

18. The system of claim 15, wherein a key is identified in response to the mouse-over action.

19. The system of claim 18, wherein the step of populating the balloon object further comprises sending a query comprising at least the key to a visualization module and receiving waveform data from the visualization module, wherein the waveform data is identified within simulation results using at least the key.

20. The system of claim 19, wherein the waveform data comprises at least data identified within simulation results using at least the key, and the simulation results correspond to the electronic circuit.

\* \* \* \* \*